(12) United States Patent
Magdun

(10) Patent No.: US 7,318,599 B2
(45) Date of Patent: Jan. 15, 2008

(54) MODULAR INFLATABLE RESTRAINT APPARATUS

(75) Inventor: Marius Magdun, Cicero, IN (US)

(73) Assignee: Indiana Mills & Manufacturing Inc., Westfield, IN (US)

( * ) Notice: Subject to any disclaimer, the term of this patent is extended or adjusted under 35 U.S.C. 154(b) by 375 days.

(21) Appl. No.: 10/914,513

(22) Filed: Aug. 9, 2004

(65) Prior Publication Data

US 2006/0028000 A1 Feb. 9, 2006

(51) Int. Cl.
*B60R 21/16* (2006.01)
(52) U.S. Cl. ............... 280/728.2; 280/730.1; 280/730.2; 280/736
(58) Field of Classification Search ............. 280/728.2, 280/728.3, 730.1, 730.2, 736, 742, 728.1
See application file for complete search history.

(56) References Cited

U.S. PATENT DOCUMENTS

| | | | | |
|---|---|---|---|---|
| 3,797,859 A | * | 3/1974 | Matthews | 280/740 |
| 3,877,719 A | * | 4/1975 | Lewis et al. | 280/733 |
| 4,911,471 A | * | 3/1990 | Hirabayashi | 280/732 |
| 5,069,480 A | * | 12/1991 | Good | 280/732 |
| 5,172,933 A | * | 12/1992 | Strasser | 280/740 |
| 5,454,593 A | | 10/1995 | Armstrong et al. | |
| 5,556,224 A | * | 9/1996 | Niskanen | 403/379.2 |
| 5,683,102 A | | 11/1997 | Davis et al. | |
| 5,719,351 A | | 2/1998 | Johnson et al. | |
| 5,738,372 A | | 4/1998 | Lowe et al. | |
| 6,029,994 A | * | 2/2000 | Perotto et al. | 280/736 |
| 6,082,761 A | * | 7/2000 | Kato et al. | 280/730.2 |
| 6,227,560 B1 | | 5/2001 | Voikmann et al. | |
| 6,335,365 B1 | | 1/2002 | Heinzelmann et al. | |
| 6,374,609 B1 | | 4/2002 | Evans et al. | |
| 6,375,215 B1 | | 4/2002 | Ross et al. | |
| 6,497,429 B2 | * | 12/2002 | Matsumoto | 280/730.2 |
| 6,620,269 B1 | | 9/2003 | Canterberry et al. | |
| 6,634,389 B2 | | 10/2003 | Noone et al. | |
| 6,669,226 B2 | | 12/2003 | Fowler et al. | |
| 6,682,796 B2 | | 1/2004 | Ito et al. | |
| 6,694,972 B2 | | 2/2004 | Hetzel, Jr. | |
| 6,709,009 B1 | | 3/2004 | Michael et al. | |
| 6,726,363 B1 | | 4/2004 | Marbler et al. | |
| 6,866,292 B2 | * | 3/2005 | Thomas | 280/730.2 |
| 7,156,413 B2 | * | 1/2007 | Fischer et al. | 280/728.2 |

(Continued)

FOREIGN PATENT DOCUMENTS

JP 2002046564 A * 2/2002

*Primary Examiner*—Eric Culbreth
*Assistant Examiner*—Joseph Rocca
(74) *Attorney, Agent, or Firm*—Barnes & Thornburg LLP

(57) ABSTRACT

A modular inflatable restraint apparatus includes an elongated housing defining an open channel, a manifold tube, an air bladder inflator and an inflatable air bladder all positioned within the open channel of the housing when the air bladder is deflated. The air bladder is secured to the manifold tube with an open end of the manifold tube in fluid communication with an interior portion of the air bladder and with an inflation end of the inflator. An elongated cover is mounted to the housing to cover the open channel with the manifold tube, deflated air bladder and inflator positioned therein. The inflator is responsive to an activation signal to inflate the air bladder, and at least a portion of the cover is configured to move away from the open channel to allow deployment of the air bladder from the open channel when the inflator inflates the air bladder.

22 Claims, 4 Drawing Sheets

U.S. PATENT DOCUMENTS

2002/0017415 A1* 2/2002 Campbell et al. ........... 180/271
2003/0006595 A1* 1/2003 Ozaki et al. ................ 280/740
2006/0278119 A1* 12/2006 Shilliday et al. ............ 102/530
2007/0024038 A1* 2/2007 Numoto et al. ............. 280/736
2007/0080529 A1* 4/2007 Meixner et al. ............ 280/740

* cited by examiner

MODULAR INFLATABLE RESTRAINT APPARATUS

FIELD OF THE INVENTION

The present invention relates generally to vehicle restraint systems, and more specifically to supplemental inflatable restraint systems for motor vehicles.

BACKGROUND

Supplemental inflatable restraint systems for motor vehicles are known and are operable to deploy an air bladder or bag upon detection of a sufficiently severe vehicle impact. Such air bladders or bags are typically installed in one or more locations selected by the vehicle manufacturer, and such air bladders or bags typically may not thereafter be relocated within the vehicle. It is desirable to provide for a modular inflatable restraint system that may be mounted within a motor vehicle at any desired location.

SUMMARY

The present invention may comprise one or more of the following features and combinations thereof. A modular inflatable restraint apparatus may comprise an elongated housing defining an open channel between first and second opposing ends thereof. A manifold tube may be positioned within the open channel of the housing and having one end secured to the first end of the housing and an opposite open end. An inflatable air bladder may be positioned within the open channel of the housing when the air bladder is deflated and secured to the manifold tube between the opposing ends thereof with the open end of the manifold tube in fluid communication with an interior portion of the air bladder. An inflator may be positioned within the open channel of the housing and having an inflation end coupled to the open end of the manifold tube and an opposite end secured to the second end of the housing. The inflator may be responsive to an activation signal to inflate the air bladder. An elongated cover may be mounted to the housing to cover the open channel, wherein at least a portion of the cover may be configured to move away from the open channel to allow deployment of the air bladder from the open channel when the inflator inflates the air bladder.

A first end cap may be secured to the first end of the housing, and a second end cap secured to the second end of the housing. The one end of the manifold tube may be secured to the first end cap and the opposite end of the inflator may be secured to the second end cap. The first end cap may include a first bracket configured to mount the first end of the housing to a support surface, and the second end cap may include a second bracket configured to mount the second end of the housing to the support surface.

The air bladder may have a first opening to the interior portion of the air bladder from which the one end of the manifold tube extends and a second opening to the interior portion of the air bladder from which the opposite end of the manifold tube extends with at least a section of the manifold tube between the one end and the opposite end thereof in fluid communication with the interior portion of the air bag. The manifold tube may define a plurality of openings along the portion of the manifold tube between the one end and the opposite end thereof, with the plurality of openings each fluidly coupled to the interior portion of the air bladder and to the opposite open end of the manifold tube such that the inflator may inflate the air bladder through the plurality of openings. The manifold tube may define an air chamber between the first opposite end thereof and the plurality of holes. A first sleeve may be positioned between the manifold tube and the air bladder adjacent to the first opening in the air bladder. The first sleeve may extend toward the opposite end of the manifold tube beyond the plurality of openings with the first sleeve shielding the plurality of openings from contact with the air bladder when the air bladder is deflated. A first clamp may be positioned about the air bladder, the first sleeve and the manifold tube adjacent to the first opening in the air bladder. The first clamp may be configured to adjustably clamp the air bladder to the manifold tube with the first sleeve facilitating an airtight closure of the first opening of the air bladder about the manifold tube. A second sleeve may be positioned between the manifold tube and the air bladder adjacent to the second opening in the air bladder. A second clamp may be positioned about the air bladder, the second sleeve and the manifold tube adjacent to the second opening in the air bladder. The second clamp may be configured to adjustably clamp the air bladder to the manifold tube with the second sleeve facilitating an airtight closure of the second opening of the air bladder about the manifold tube.

The inflation end of the inflator and the opposite open end of the manifold tube may each be complementarily threaded, such that the inflation end of the inflator may be received within the opposite open end of the manifold tube and form an air tight fit therebetween.

The apparatus may further include means for restraining movement of the inflator relative to the open channel of the housing.

The apparatus may further include an impact sensor producing the activation signal upon detection of at least a predefined deceleration level of a vehicle carrying the impact sensor and the apparatus. Alternatively or additionally, the apparatus may further include a roll sensor producing the activation signal upon detection of a roll event of a vehicle carrying the roll sensor and the apparatus.

The elongated cover covering the open channel may have one longitudinal side mounted to the housing adjacent to one longitudinal side of the open channel and an opposite longitudinal side mounted to the housing adjacent to an opposite longitudinal side of the open channel. The cover may define a longitudinal seam between the opposing longitudinal sides thereof, and the seam may be responsive to inflation of the air bladder to open and allow deployment of the air bag from the open channel. The cover may be configured to urge the air bladder deployed from the open channel toward one of the opposing longitudinal sides of the open channel when the seam is opened.

These and other features of the present invention will become more apparent from the following description of the illustrative embodiment.

DESCRIPTION OF THE ILLUSTRATIVE EMBODIMENTS

Figure 1:
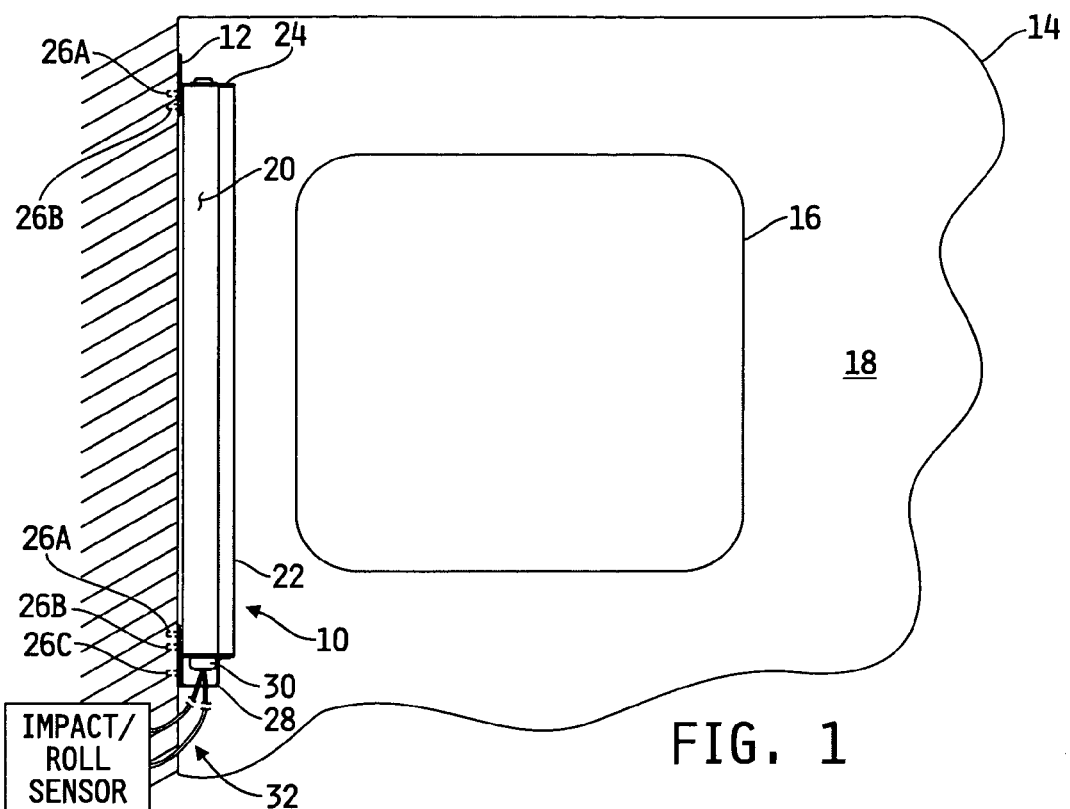
FIG. 1 is a front elevational view of a modular inflatable air bag apparatus mounted inside of a vehicle adjacent to a vehicle window.

For the purposes of promoting an understanding of the principles of the invention, reference will now be made to a number of illustrative embodiments illustrated in the drawings and specific language will be used to describe the same.

Figure 2:
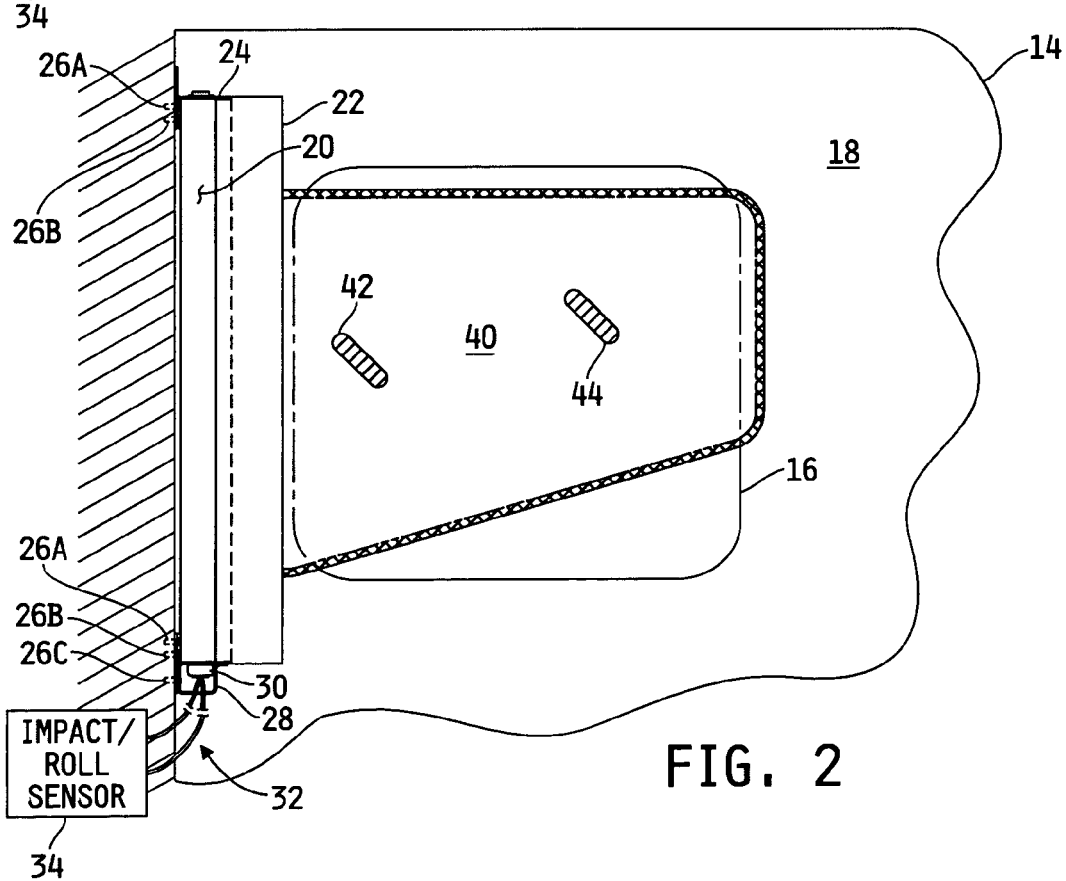
FIG. 2 is a front elevational view similar to that of FIG. 1 showing the air bag deployed from the modular inflatable air bag apparatus.

Referring to FIGS. 1 and 2, front elevational views of a modular inflatable air bag apparatus 10 are shown with the apparatus 10 mounted inside of a vehicle 14 adjacent to a vehicle window 16. In the illustrated embodiment, the apparatus 10 is shown mounted vertically to a surface 12 of the vehicle that is generally perpendicular to a surface 18 of the vehicle defining the window 16. It will be appreciated, however, that the apparatus 10 may be alternatively configured to mount to the surface 18 or to another interior surface of the vehicle 14, and/or be mounted to any such surface at any desired orientation relative to a reference orientation, e.g., vertical, horizontal, diagonal, etc., and still operate in the manner that will be described hereinafter. In any case, the apparatus 10 includes a housing 20 carrying an inflatable air bladder or bag 40 in its deflated state, a conventional air bladder inflator 30 and other components, which will be described in greater detail hereinafter, all of which are covered by a cover 22 mounted to the housing 20.

A first end plate 24 includes a bracket defining a number of bores therethrough for receiving a corresponding number of fasteners, e.g., fasteners 26A and 26B, for mounting one end of the apparatus 10 to a support surface, e.g., the surface 12 of FIGS. 1 and 2. Likewise, a second end plate 28 includes another bracket defining a number of bores therethrough for receiving a corresponding number of fasteners, e.g., fasteners 26A, 26B and 26C, for mounting the opposite end of the apparatus 10 to a support surface, e.g., the surface 12. It will be appreciated that more or fewer brackets of like or other suitable configuration, along with any number of conventional fasteners or fastening material, may be provided at any one or more desired locations along the housing 20 to secure the apparatus 10 to a support surface such as surface 12. Examples of conventional fasteners that may be used to mount the apparatus 10 to the surface 12 include, but are not limited to, any number of screws, nut/bolt combinations, rivets, nails, hooks or the like, and examples of conventional fastening materials that may alternatively or additionally used to mount the apparatus 10 to the surface 12 include, but are not limited to, adhesives, epoxies, natural or synthetic strings, ropes, interlocking straps, non-interlocking straps, tapes, or the like.

A wiring harness 32 including suitable number, e.g., 2, wires extends from the air bladder inflator 30, and is configured for electrical connection to a conventional and existing impact or roll sensor 34 carried by the vehicle 14. In embodiments wherein the sensor 34 is a conventional impact sensor, the sensor 34 is operable in a known manner to produce an air bag activation signal for deploying the air bladder 40 from the housing 20 upon detection of at least a predefined level of deceleration of the vehicle 14 or upon other detection of an impact of sufficient severity. In embodiments wherein the sensor 34 is a conventional roll sensor, the sensor 34 is operable in a known manner to produce the air bag activation signal to deploy the air bladder 40 from the housing 20 upon detection of a roll event of the vehicle 14. In either case, the inflator 30 is responsive to the air bag activation signal to inflate the air bladder 40, and as the air bladder 40 inflates it pushes the cover 22 to an open position thereby allowing deployment of the air bladder 40 away from the housing 20 as illustrated in FIG. 2. The air bladder may include one or more bladder shaping zones for defining the overall shape of the air bladder 40, e.g., two such zones 42 and 44 shown in FIG. 2, where opposing surfaces of the interior surface of the air bladder 40 may be affixed, e.g., sewn, glued or otherwise affixed, to each other for the purpose of defining the shape of the air bladder 40. Alternatively or additionally, the air bladder 40 may include with such shaping zones one or more internal baffles, internal tethers or the like that connect opposing interior surfaces of the air bladder 40.

In the application of the apparatus 10 illustrated by example in FIGS. 1 and 2, the apparatus 10 is positioned relative to a vehicle window 16 such that the air bladder 40 is deployed across the window 16 upon impact or roll-over of the vehicle 14. Alternatively, the apparatus 10 may be positioned anywhere in the vehicle 14 adjacent to any desired area that some part of an occupant may contact in the event of a vehicle impact or vehicle roll over, so that the air bladder 40 is deployed across such an area, when inflated by the inflator 30, to protect the occupant.

Figure 3:
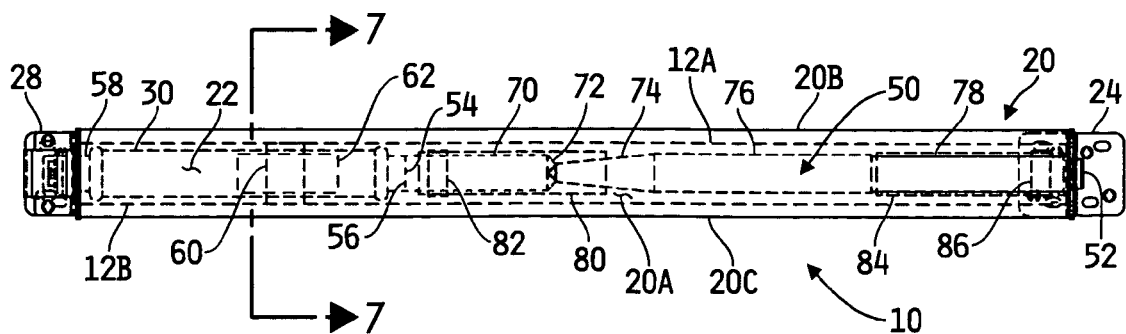
FIG. 3 is a top plan view of the modular inflatable air bag apparatus of FIGS. 1 and 2 showing many of its internal components in phantom.

Referring now to FIG. 3, a top plan view of the modular inflatable air bag apparatus 10 of FIGS. 1 and 2 is shown illustrating many of its internal components in phantom. For ease of illustrating such internal components, the air bladder 40 is omitted from FIG. 3, although it will be understood that the air bladder 40 in its deflated state will reside in the housing 20 with the cover 20 intact and mounted to the housing 20 as shown by example in FIG. 7. In any case, the housing 20 defines an open channel 20A between opposing longitudinal sides 20B and 20C, with the end plates 24 and 28 mounted to opposing ends of the housing 20 and defining terminal ends of the open channel 20A. A manifold tube 50 is positioned longitudinally in the open channel 20A, and has a first end 52 mounted to the end plate 24 and a second open end 54. The air bladder inflator 30 is also positioned longitudinally in the open channel 20A, and has an inflation end 56 operatively coupled to the open end 54 of the manifold tube 50 and an opposite end 58 mounted to the end plate 28. In the illustrated embodiment, the housing 20 is formed of a lightweight metal, e.g., aluminum, although it may alternatively be formed of other suitable materials including, but not limited to, other metals or metal alloys, moldable or formable plastic materials including resin-based materials, epoxy materials, or the like. The manifold tube 50 may illustratively be formed of a metal alloy, e.g., steel, or may alternatively be formed of other suitable materials including, but not limited to, other metals or metal alloys, moldable or formable plastic materials including resin-based materials, epoxy materials, or the like.

The combination of the manifold tube 50 and the air bladder inflator 30 are thus longitudinally positioned within the open channel 20A and secured to the housing 20. As illustrated in FIG. 3 and shown in greater detail in FIG. 7, a retaining clip 60 is mounted to the housing 20 and a compression pad 62 is positioned between the retaining clip 60 and the inflator 30. The compression pad 62 may illustratively be a flexible material such as, for example, a synthetic sponge material or the like, and is interposed between the clip 60 and the inflator 30 such that the combination of the clip 60 and pad 62 dampen transverse movement of the combination manifold tube 50 and air bladder inflator 30 within the open channel 20A of the housing 20. In this regard, those skilled in the art will recognize that the clip 60 and pad 62 may be positioned anywhere within the open channel 20A between the housing 20 and either of the air bladder inflator 30 and manifold tube 50, as long as such alternate positioning does not interfere with deployment of the air bladder 40 from the open channel 20A.

The air bladder inflator or gas generator 30 is a conventional, self-contained inflation device that is illustratively provided in the embod 3 as a pressurized cylinder storing high pressure gas, pyrotechnic material or combination thereof. When an air bladder activation signal is received by the inflator 30 via the wiring harness 32, such as in the event of a sufficiently severe vehicle impact or vehicle roll-over, the inflator 30 expels the high pressure air, pyrotechnic material or combination thereof from the inflation end 56 and into the open end 54 of the manifold tube 50.

Figure 4A:
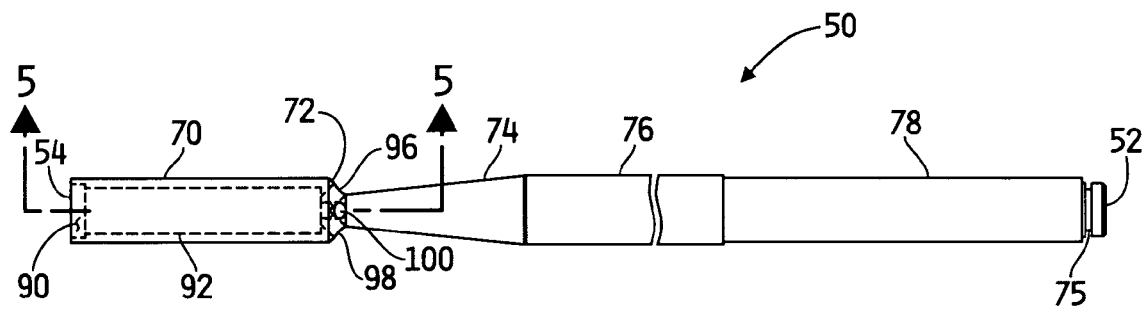
FIG. 4A is a side elevational view of one embodiment of the manifold tube forming part of the modular air bag apparatus of FIGS. 1-3.

Referring now to FIG. 4A, one illustrative embodiment of the manifold tube 50 of FIG. 3 is shown. In the illustrated embodiment, the generally cylindrical manifold tube 50 includes an air chamber section 70 having one end defining the open end 54 of the manifold tube 50 and an opposite end coupled to an air transfer section 72 that tapers away from the air chamber section 70 to a reducing cross-sectional area where it meets a first support section 74. The first support section extends away from the air transfer section 72 and tapers to an increasing cross-sectional area where it meets a second support section 76. The second support section 76 extends away from the first support section 74 to a third support section 78 having a diameter that is reduced from that of the second support section 76. The opposite end of the third support section defines the end 52 of the manifold tube 50, wherein the end 52 has a diameter less than that of the third support section 78. The first, second and third support sections 74, 76 and 78 respectively may be solid or hollow in cross-section.

In the illustrated embodiment, the manifold tube 50 defines a recessed portion 75 about its circumference adjacent to the end 52. The end plate 24 defines a bore therethrough sized large enough to receive the end 52 therethrough but small enough so that the third support section 78 of the manifold tube 50 will not travel therethrough. A conventional C-shaped retaining clip (not shown) is then received about the recessed portion 75 between the end plate 24 and the end 52 of the manifold tube 50 to secure the manifold tube 50 to the end plate 24. The end 58 of the inflator 30 is configured in like manner, and is secured to the end plate 28 as just described. It will be appreciated, however, that such illustrated structural arrangements for mounting the manifold tube 50 to the end plate 24 and for mounting the inflator 30 to the end plate 28 are provided only by way of illustration, and that other conventional techniques for mounting the manifold tube 50 and the inflator 30 to opposite ends of the housing 20 may alternatively or additionally be used.

Figure 5:
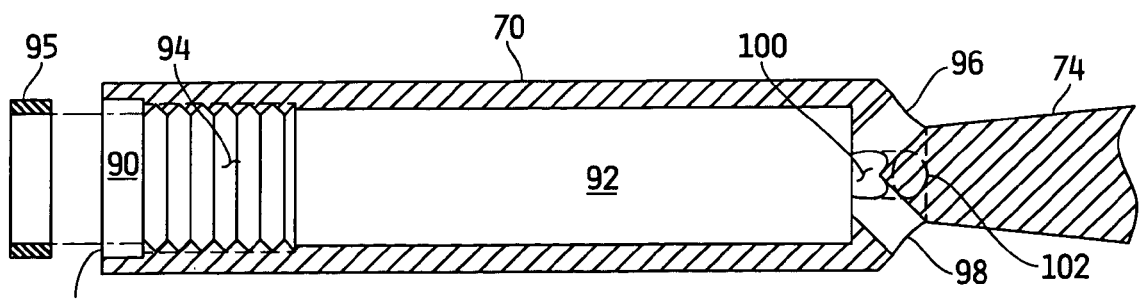
FIG. 5 is a cross-sectional view of one end of the manifold tube illustrated in FIG. 4A taken along section lines 5-5.

Referring now to FIG. 5, a cross-sectional view of a portion of the manifold tube 50 of FIG. 4A, taken along section lines 5-5, is shown. In the embodiment illustrated in FIG. 5, the air chamber section 70 defines an a bore 90 adjacent to the open end 54 of the manifold tube 50, wherein the bore terminates at a threaded portion 94 of an air chamber 92 defined by the air chamber section 70. The threaded portion 94 is threaded complementarily to that of the inflation end 56 of the air bladder inflator 30, and the bore 90 is sized to receive an annular seal or washer 95 as illustrated in FIG. 5. The annular seal 95 may illustratively be formed of a flexible or deformable material such as, for example, rubber or synthetic material having similar properties, or alternatively may be formed of one or more conventional semi-rigid and/or rigid materials. As illustrated in FIG. 3, the inflation end 56 of the air bladder inflator 30 is fluidly coupled to the air chamber 92 by threading its threaded inflation end 56 into the complementarily threaded portion 94 of the air chamber 92 with the annular seal or washer 95 positioned within the bore 90. The annular seal or washer 95 deforms within the bore 90 as the inflation end 56 of the inflator 30 is received within the threaded portion 94 of the air chamber 92 to ensure an air-tight seal between the inflation end 56 of the air bladder inflator 30 and the air chamber 92.

The air transfer section 72 of the manifold tube 50 defines a number of equally-spaced bores therethrough to the air chamber 92 of the air chamber section 70 to allow air, pyrotechnic material or a combination thereof entering the end 54 of the air chamber 92 to escape the air chamber 92 into the interior of the air bladder 40 fluidly coupled to the manifold tube 50 as will be described in greater detail hereinafter with respect to FIG. 6. In the illustrated embodiment, the air transfer section 72 defines four such bores therethrough, 96, 98, 100 and 102, although it will be understood that the air transfer section 72 may alternatively defined more or fewer such bores therethrough to the air chamber 92. The total number of such bores, as well as the spacing therebetween, will typically be dictated by the specific application. In any case, the structural configuration of the air chamber section 70 and the air transfer section 72 of the manifold tube 50 just described provides for fluid communication between the air chamber 92 and the interior of the air bladder 40 when the air bladder 40 is mounted to the manifold tube 50 as will be described in detail with respect to FIG. 6.

Figure 4B:
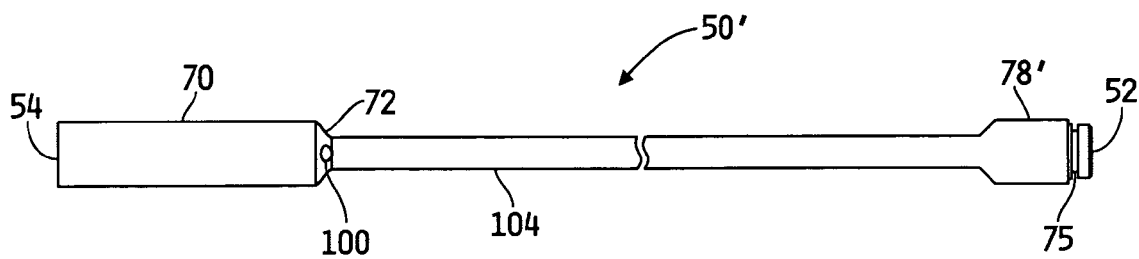
FIG. 4B is a side elevational view of an alternate embodiment of the manifold tube forming part of the modular air bag apparatus of FIGS. 1-3.

Referring now to FIG. 4B, an alternate embodiment 50' of the manifold tube 50 illustrated in FIGS. 3 and 4A is shown. The manifold tube 50' shown in FIG. is identical in many respects to the manifold tube 50' illustrated and described thus far with respect to FIGS. 3 and 4A, and like numbers are therefore used to identify like components. Unlike the manifold tube 50 of FIGS. 3 and 4A, the manifold tube 50' replaces the first and second support sections 74 and 76 respectively, as well as at least some of the third support section 78, with a single, smaller diameter support section 104 that extends into a shorter third support section 78'. The smaller diameter support section 104 may be hollow or solid, and may be sized with a suitably reduced diameter to provide for material savings over the embodiment 50 and/or reduced overall weight of the apparatus 10. The third support section 78', in this embodiment, is sized to provide sufficient length for suitable mounting of the air bladder 40 thereto.

Figure 6:
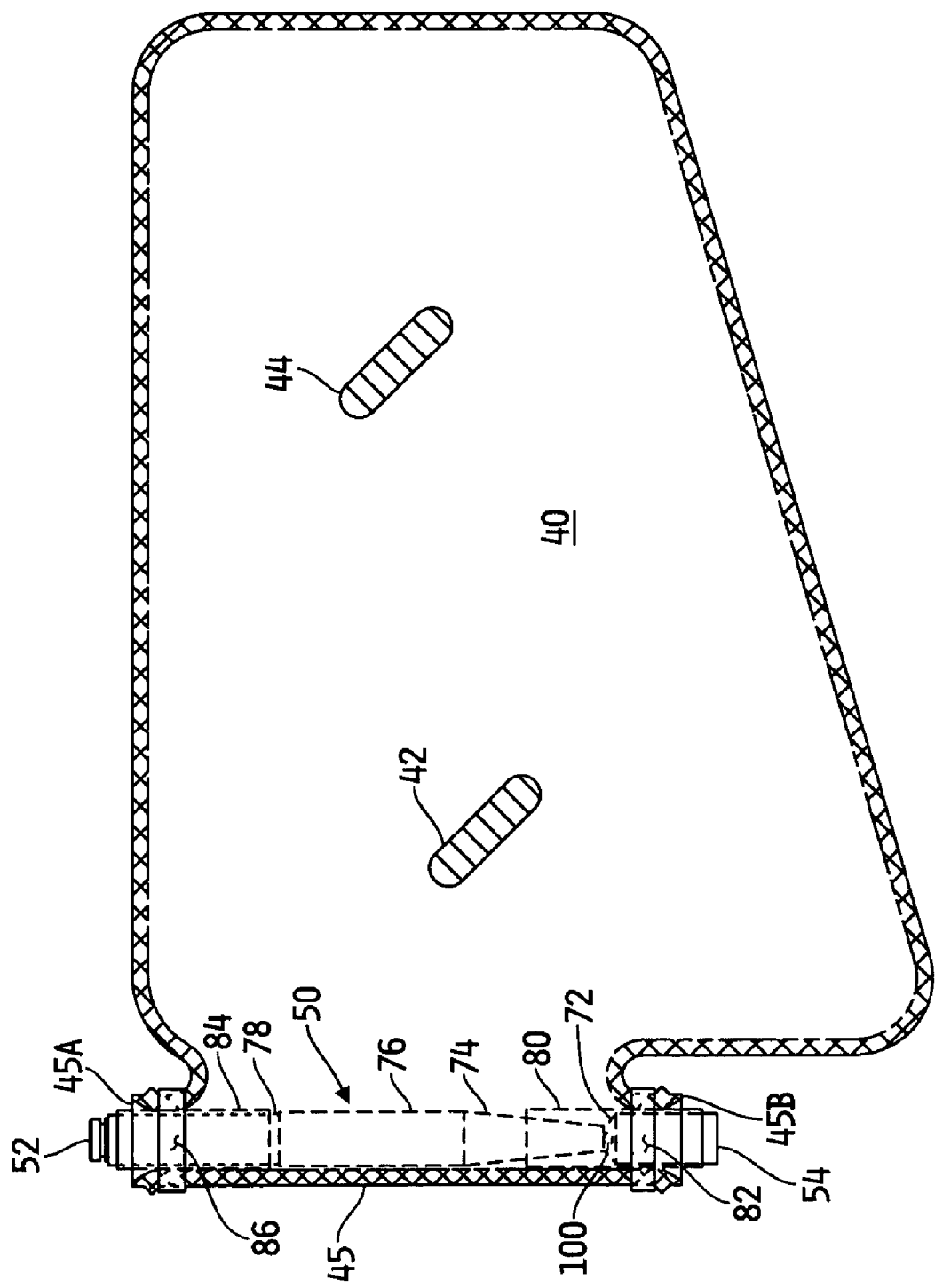
FIG. 6 is a front elevational view of the manifold tube and air bag of FIGS. 1-3 showing one illustrative arrangement for mounting the air bag to the manifold tube.

Referring now to FIG. 6, a front elevational view of the manifold tube 50 and air bladder 40 of FIG. 3 is shown illustrating one example arrangement for operatively mounting the air bladder 40 to the manifold tube 50. In the illustrated embodiment, the manifold tube 50 is inserted into and through opposing openings 45A and 45B in the air bladder 40 such that the end 52 of the manifold tube 50 extends from one opening 45A and the opposite end 54 extends from the other opening 45B with the remaining portion of the manifold tube in fluid communication with the interior of the air bladder 40. A first sleeve 80 is positioned between the manifold tube 50 and the air bladder 40 adjacent to the opening 45B in the air bladder 40, and the first sleeve 80 extends toward the opposite end 52 of the manifold tube 50 beyond the one or more bores or openings 96-102 defined through the air transfer section 72 of the manifold tube 50. In the illustrated embodiment, the first sleeve extends beyond the one or more bores 96-102 to shield the one or more bores 96-102 from contact with the interior of the air bladder 40 when the air bladder 40 is deflated to thereby provide an obstructed fluid passageway from the open end 54 of the manifold tube 50 to the interior of the air bladder. A conventional clamp 82 is positioned about the air bladder 40, the first sleeve 80 and the manifold tube 50 adjacent to the opening 45B in the air bladder, and the clamp 80 is configured to adjustably clamp the air bladder 40 to the manifold tube 50 with the first sleeve 80 facilitating an airtight closure of the opening 45B of the air bladder 40 about the manifold tube 50.

A second sleeve 84 is positioned between the manifold tube 50 and the air bladder 40 adjacent to the opening 45A in the air bladder 40, and the second sleeve 84 extends toward the opposite end 54 of the manifold tube 50 and terminates adjacent to the intersection of the second and third support sections 76 and 78 respectively of the manifold tube 50. Another conventional clamp 86 is positioned about the air bladder 40, the second sleeve 86 and the manifold tube 50 adjacent to the opening 45A in the air bladder, and the clamp 86 is configured to adjustably clamp the air bladder 40 to the manifold tube 50 with the second sleeve 84 facilitating an airtight closure of the opening 45A about the air bladder 40 and the manifold tube 50. With this mounting arrangement, the open end 54 of the manifold tube 50 is in fluid communication with the interior portion of the air bladder 40 via the one or more bores 96-102 positioned between the clamps 82 and 86.

In the illustrated embodiment, the first and second sleeves 80 and 84 are flexible tube structures having sufficient stiffness to allow the first sleeve 80 to shield the one or more bores 96-102 from contact with the interior of the air bladder 40 when the air bladder 40 is deflated, yet having sufficient flexibility to conform to the outer perimeter of the manifold tube 50 to allow airtight clamping of the air bladder 40 between the clamps 82 and 86 and the manifold tube 50. The first and second sleeves 80 and 84 are, in one embodiment, formed of a neoprene polyester combination, although the sleeves 80 and 84 may alternatively be formed of other suitable materials or material combinations having the properties just described.

Figure 7:
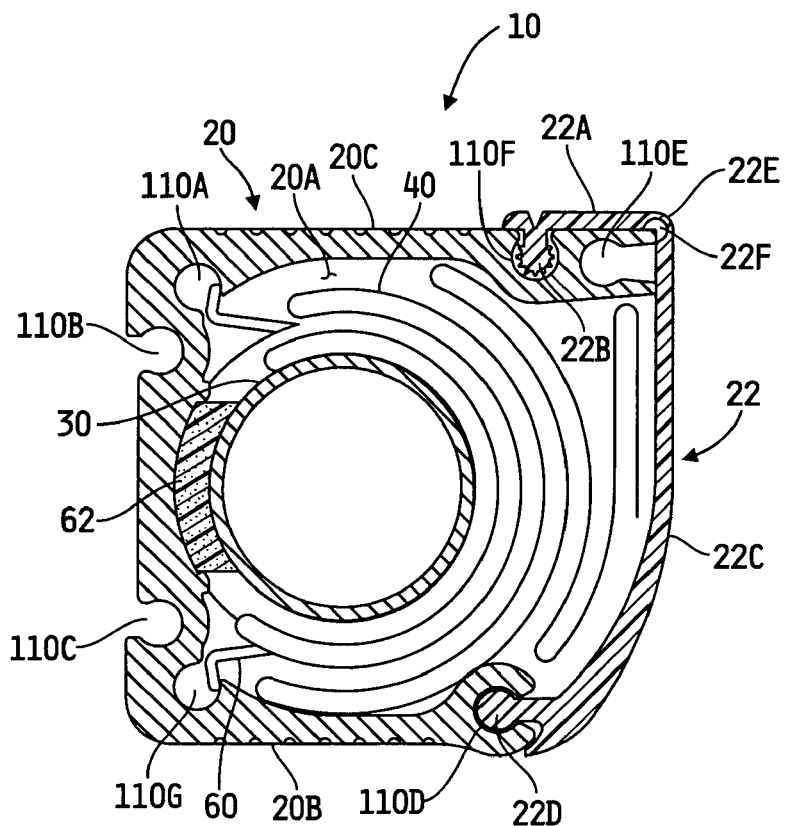
FIG. 7 is a cross-sectional view of the modular inflatable air bag apparatus of FIG. 3 taken along section lines 7-7.
Figure 8:
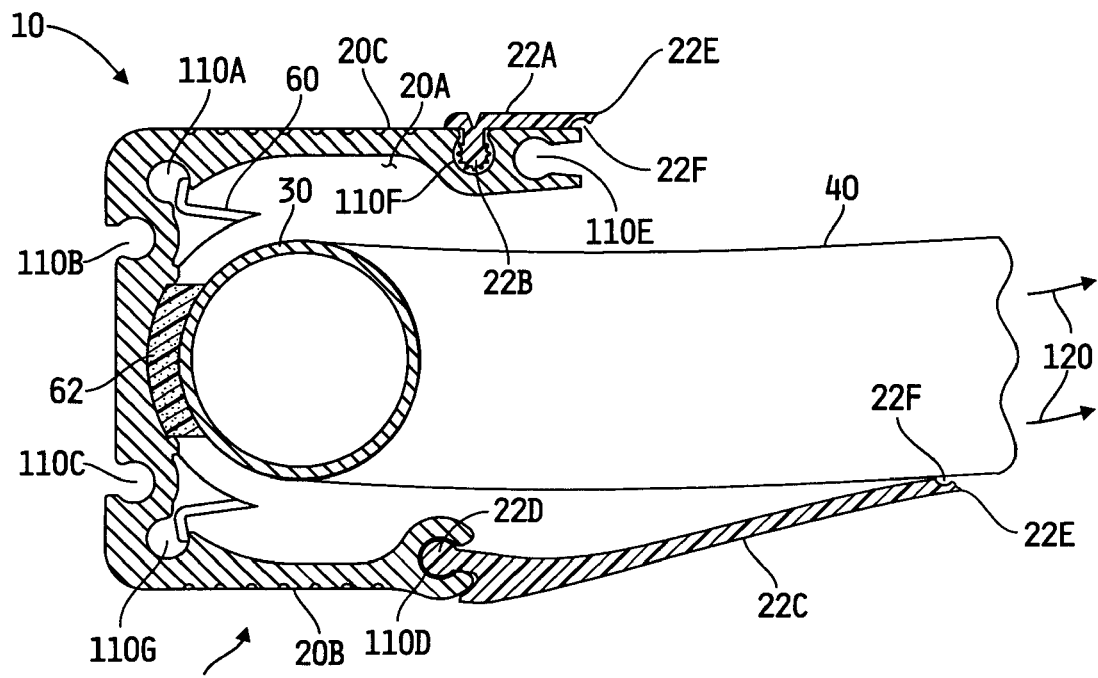
FIG. 8 is a cross sectional view similar to that of FIG. 7 showing the inflatable air bag deployed from the apparatus housing.

Referring now to FIGS. 7 and 8, cross-sectional views of the modular inflatable air bag apparatus 10 of FIG. 3, taken along section lines 7-7, are shown. In FIG. 7, the air bladder 40 is shown positioned, in its deflated state, inside the open channel 20A. In the illustrated embodiment, the elongated cover 22 has a first cover portion 22A having a protrusion 22B extending away from an internal surface thereof adjacent to one longitudinal side thereof. A second cover portion 22C has another protrusion 22D extending away from an internal surface thereof adjacent to another longitudinal side thereof. The opposite longitudinal side of the first cover portion 22A extends into the opposite longitudinal side of the second cover portion 22C and defines a longitudinal seam 22E at the interface between the first and second cover portions 22A and 22C.

The housing 20 defines one a longitudinal recess 110D along the side 20B of the housing 20 adjacent to the open channel 20A, and another longitudinal recess 110F along the side 20C of the housing 20 adjacent to the open channel 20A. The recesses 110D and 110F are configured to receive therein the protrusions 22D and 22B respectively to thereby mount the cover 22 to the housing 22 with the cover portion 22D extending over and covering the open channel 20A.

In the illustrated embodiment, the longitudinal seam 22E is formed by removing a longitudinal strip of the cover material from the interior surface of the cover 22 directly beneath the longitudinal seam 22E so that a longitudinal void 22F is created in the interior surface of the cover 22 beneath the longitudinal seam 22E. The longitudinal seam 22E is configured to separate when sufficient pressure is applied to the interior surface of the cover portion 22C resulting from inflation of the air bladder 40 so that the cover portion 22C separates from the cover portion 22A and opens relative to the open channel 20A to allow deployment of the inflating air bladder 40 from the open channel 20A as illustrated in FIG. 8. In an alternative embodiment (not shown), the longitudinal edge of the cover portion 22C adjacent to the recess 110E defined in the housing 20 may define a protrusion that is received within the recess 110E to secure the cover portion 22C to the housing 20 when the air bladder 40 in it deflated state is located within the open channel 20A of the housing 20. Such a protrusion would be sized to separate from the recess 110E when sufficient pressure is applied to the interior surface of the cover portion 22C resulting from inflation of the air bladder 40 so that the cover portion 22C separates from the housing 20 and opens relative to the open channel 20A to allow deployment of the inflating air bladder 40 from the open channel 20A as generally illustrated in FIG. 8. Those skilled in the art will recognize other techniques and/or structures for providing a separable seam 22E between the cover portions 22A and 22C or for providing some other separable structure between the longitudinal edge of the cover portion 22C and the side 20C of the housing 20, and any such alternate techniques and/or structures are intended to fall within the scope of the claims appended hereto. In the illustrated embodiment, the cover 22 is suitably flexible to allow the cover portion 22C to move away from the cover portion 22A and open to allow deployment of the inflating air bladder 40, yet is also suitably stiff to urge deployment of the inflating air bladder 40 in the direction illustrated by the arrows 120. This feature facilitates deployment of the air bladder 40 across, and adjacent to, the intended area, e.g., a vehicle window such as the window 16 illustrated in FIGS. 1 and 2.

The housing 20 further defines a number of additional longitudinal recesses therein. For example, recesses 110A, 110E (as described hereinabove) and 110G, along with recess 110D and optionally recess 110F, define attachment structures for receiving therein and engaging appropriate fasteners (not shown) for attaching the end plates 24 and 28 to the corresponding ends 52 and 54 of the housing 20. The recesses 110A and 110G additionally provide attachment locations for attaching the clip 60 to the housing 20. The recesses 110B and 110C provide attachment locations for attachment to the housing 20 of a supplemental cover or wrapping that may be variously configured with appropriate graphical warnings, aesthetically pleasing and/or blending colors and/or textures, or the like.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A modular inflatable restraint apparatus comprising:
   an elongated housing defining an open channel between first and second opposing ends thereof,
   a manifold tube positioned within the open channel of the housing and having one end secured to the first end of the housing and an opposite open end,
   an inflatable air bladder positioned within the open channel of the housing when the air bladder is deflated and secured to the manifold tube between the opposing ends thereof with the open end of the manifold tube in fluid communication with an interior portion of the air bladder,
   an inflator positioned within the open channel of the housing and having an inflation end forming an end-to-end coupling with the open end of the manifold tube and an opposite end secured to the second end of the housing, the inflator responsive to an activation signal to inflate the air bladder, and
   an elongated cover mounted to the housing to cover the open channel, at least a portion of the cover configured to move away from the open channel to allow deployment of the air bladder from the open channel when the inflator inflates the air bladder.

2. The apparatus of claim 1 further including:
   a first end cap secured to the first end of the housing, and
   a second end cap secured to the second end of the housing, wherein the one end of the manifold tube is secured to the first end cap and the opposite end of the inflator is secured to the second end cap.

3. The apparatus of claim 2 wherein the first end cap includes a first bracket configured to mount the first end of the housing to a support surface, and wherein the second end cap includes a second bracket configured to mount the second end of the housing to the support surface.

4. The apparatus of claim 1 wherein the air bladder has a first opening to the interior portion of the air bladder from which the one end of the manifold tube extends and a second opening to the interior portion of the air bladder from which the opposite end of the manifold tube extends with at least a section of the manifold tube between the one end and the opposite end thereof in fluid communication with the interior portion of the air bag.

5. The apparatus of claim 4 wherein the manifold tube defines a plurality of openings along the portion of the manifold tube between the one end and the opposite end thereof, the plurality of openings each fluidly coupled to the interior portion of the air bladder and to the opposite open end of the manifold tube, the inflator inflating the air bladder through the plurality of openings.

6. The apparatus of claim 5 wherein the manifold tube defines an air chamber between the first opposite end thereof and the plurality of holes.

7. The apparatus of claim 5 further including a first sleeve positioned between the manifold tube and the air bladder adjacent to the first opening in the air bladder, the first sleeve extending toward the opposite end of the manifold tube beyond the plurality of openings, the first sleeve shielding the plurality of openings from contact with the air bladder when the air bladder is deflated.

8. The apparatus of claim 7 further including a first clamp positioned about the air bladder, the first sleeve and the manifold tube adjacent to the first opening in the air bladder, the first clamp configured to adjustably clamp the air bladder to the manifold tube with the first sleeve facilitating an airtight closure of the first opening of the air bladder about the manifold tube.

9. The apparatus of claim 8 further including:
   a second sleeve positioned between the manifold tube and the air bladder adjacent to the second opening in the air bladder, and
   a second clamp positioned about the air bladder, the second sleeve and the manifold tube adjacent to the second opening in the air bladder, the second clamp configured to adjustably clamp the air bladder to the manifold tube with the second sleeve facilitating an airtight closure of the second opening of the air bladder about the manifold tube.

10. The apparatus of claim 1 wherein the inflation end of the inflator and the opposite open end of the manifold tube are each complementarily threaded, the inflation end of the inflator received within the opposite open end of the manifold tube and forming an air tight fit therebetween.

11. The apparatus of claim 1 further including means for restraining movement of the inflator relative to the open channel of the housing.

12. The apparatus of claim 1 further including an impact sensor producing the activation signal upon detection of at least a predefined deceleration level of a vehicle carrying the impact sensor and the apparatus.

13. The apparatus of claim 1 further including a roll sensor producing the activation signal upon detection of a roll event of a vehicle carrying the roll sensor and the apparatus.

14. A modular inflatable restraint apparatus comprising:
   an elongated housing defining an open channel between first and second opposing ends of the housing,
   a manifold tube having one end secured to the first end of the housing and an opposite open end, the manifold tube defining at least one opening between the opposing ends thereof in fluid communication with the open end of the manifold tube,
   an inflatable air bladder secured to the manifold tube with the at least one opening of the manifold tube in fluid communication with an interior portion of the air bladder,
   an inflator having an inflation end forming and end-to-end coupling with the open end of the manifold tube and an opposite end secured to the second end of the housing, the inflator responsive to an activation signal to inflate the air bladder, and
   an elongated cover covering the open channel with the manifold tube, the air bladder in a deflated state and the inflator positioned therein.

15. The apparatus of claim 14 further including:
   a first bracket secured to the first end of the housing, and
   a second bracket secured to the second end of the housing, the first and second brackets configured to mount the housing to a support surface.

16. The apparatus of claim 14 further including an impact sensor producing the activation signal upon detection of at least a predefined deceleration level of a vehicle carrying the impact sensor and the apparatus.

17. The apparatus of claim 14 further including a roll sensor producing the activation signal upon detection of a roll event of a vehicle carrying the roll sensor and the apparatus.

18. A modular inflatable restraint apparatus comprising:
an elongated housing defining an open channel between first and second opposing ends thereof,
a manifold tube having one end secured to the first end of the housing and an opposite end,
an inflatable air bladder secured to the manifold tube,
an inflator having an inflation end forming and end-to-end coupling with the opposite end of the manifold tube and an opposite end secured to the second end of the housing, the inflator responsive to an activation signal to inflate the air bladder, and
an elongated cover covering the open channel, the cover having one longitudinal side mounted to the housing adjacent to one longitudinal side of the open channel and an opposite longitudinal side mounted to the housing adjacent to an opposite longitudinal side of the open channel, the cover defining a longitudinal seam between the opposing longitudinal sides thereof, the seam responsive to inflation of the air bladder to open and allow deployment of the air bag from the open channel.

19. The apparatus of claim 18 wherein the cover is configured to urge the air bladder deployed from the open channel toward one of the opposing longitudinal sides of the open channel when the seam is opened.

20. The apparatus of claim 18 further including:
a first bracket secured to the first end of the housing, and
a second bracket secured to the second end of the housing, the first and second brackets configured to mount the housing to a support surface.

21. The apparatus of claim 18 further including an impact sensor producing the activation signal upon detection of at least a predefined deceleration level of a vehicle carrying the impact sensor and the apparatus.

22. The apparatus of claim 18 further including a roll sensor producing the activation signal upon detection of a roll event of a vehicle carrying the roll sensor and the apparatus.

* * * * *